March 10, 1936.  E. S. COOK ET AL  2,033,114
FLUID PRESSURE BRAKE
Original Filed June 15, 1932
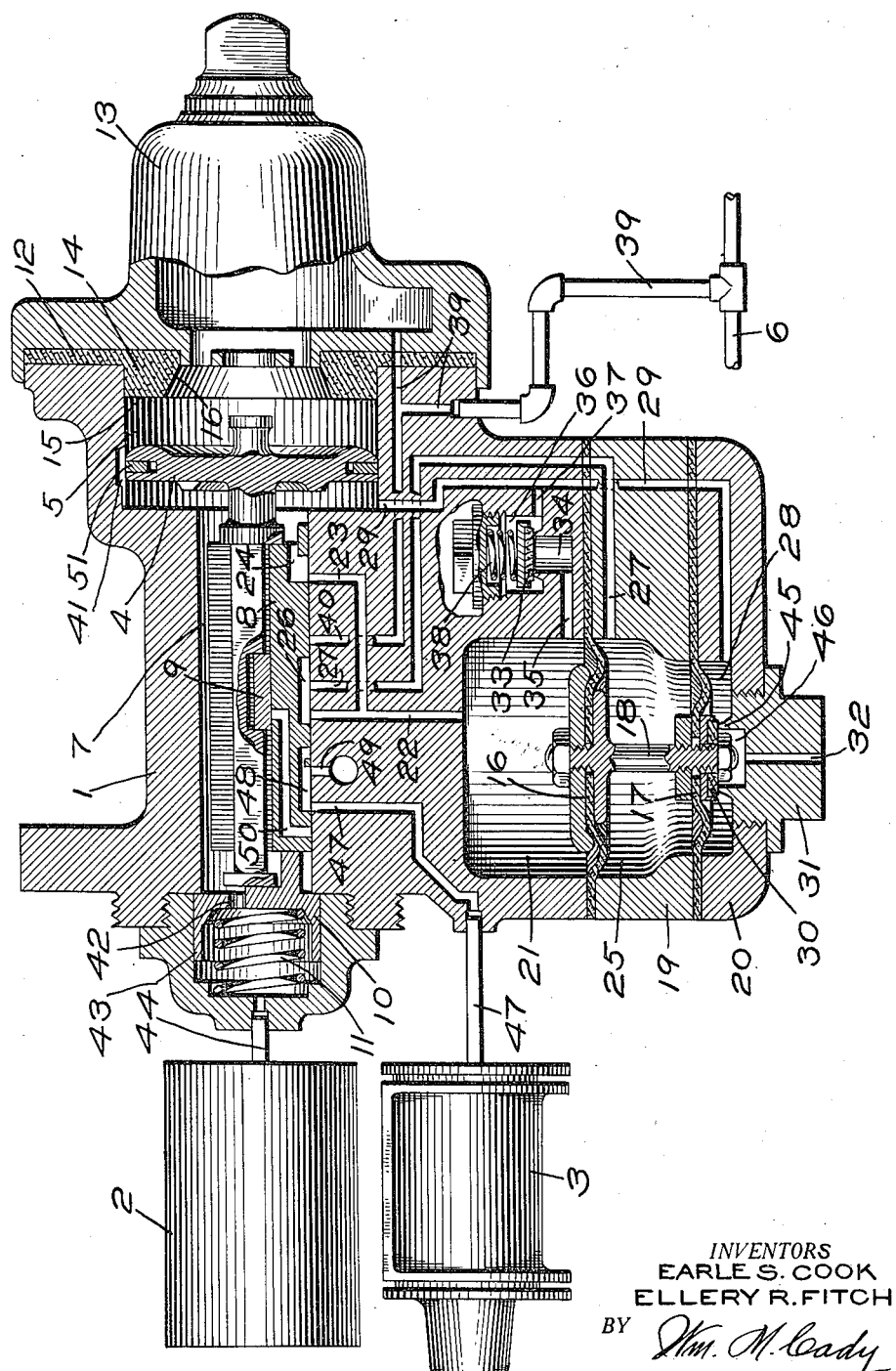
INVENTORS
EARLE S. COOK
ELLERY R. FITCH
BY *Wm. M. Cady*
ATTORNEY.

Patented Mar. 10, 1936

2,033,114

UNITED STATES PATENT OFFICE 2,033,114

FLUID PRESSURE BRAKE

Earle S. Cook, Wilkinsburg, and Ellery R. Fitch, Irwin, Pa., assignors to The Westinghouse Air Brake Company, Wilmerding, Pa., a corporation of Pennsylvania Application June 15, 1932, Serial No. 617,334
Renewed November 15, 1933

18 Claims. (Cl. 303—70)

This invention relates to fluid pressure brakes and more particularly to a fluid pressure brake equipment adapted to operate upon a reduction in brake pipe pressure to effect an application of the brakes and upon an increase in brake pipe pressure to effect a release of the brakes.

With the usual fluid pressure brake equipment, difficulty is at times encountered in obtaining a sufficient increase in brake pipe pressure acting on one side of the triple valve piston over auxiliary reservoir pressure acting on the other side to move the piston and associated valves to release position to effect a release of the brakes. This is particularly true at the rear end of a long train, where the rate of increase in brake pipe pressure is relatively slow and leakage past the triple valve piston may charge the auxiliary reservoir from the brake pipe at substantially the same rate as the brake pipe is being charged. Even if leakage past the piston is tolerable, if the friction of the piston and slide valves is excessive, a failure to move or a delayed movement of the triple valve to release position may result.

The principal object of our invention is to provide improved means for overcoming the above difficulty.

According to our invention, we provide a release insuring valve device comprising a flexible diaphragm having at one side a chamber which is always in communication, past a check valve, with the triple valve slide valve chamber and which, when the triple valve piston is in release position, is also in communication, through ports and passages controlled by the triple valve slide valve, with the slide valve chamber. Due to the latter communication, said diaphragm chamber contains fluid at auxiliary reservoir pressure when the triple valve piston is in release position, but when the piston is in brake application or lap position, said communication is cut off and said diaphragm chamber is then in communication with the slide valve chamber only past the above mentioned check valve. Therefore, in brake application and lap positions of the triple valve piston, the pressure in said diaphragm chamber will reduce substantially at the same rate and to the same degree as auxiliary reservoir pressure. A chamber at the other side of the diaphragm is subject, when the triple valve piston is in brake application and lap positions, to brake pipe pressure.

According to the construction, when brake pipe pressure in the second mentioned diaphragm chamber is increased a predetermined small degree above the reduced auxiliary reservoir pressure in the first mentioned diaphragm chamber, as when effecting a release, the release insuring valve device will operate to vent fluid from the auxiliary reservoir until the auxiliary reservoir pressure acting on one side of the triple valve piston is reduced sufficiently below brake pipe pressure acting on the other side of said piston to cause said piston to promptly operate and move the associated valves to release position.

According to one feature of the invention, when brake pipe pressure is being increased to effect a release of the brakes, leakage of brake pipe fluid into the slide valve chamber past the triple valve piston ring will not interfere with the proper operation of the release insuring valve device because a back flow of fluid under pressure from the slide valve chamber to the first mentioned diaphragm chamber is prevented by the above mentioned check valve. In other words, when the triple valve piston is in brake application position and brake pipe pressure is being increased so as to effect a release of the brakes, the pressure of the fluid in the first mentioned diaphragm chamber remains substantially the same as the pressure to which auxiliary reservoir pressure is reduced in effecting an application and, therefore, brake pipe pressure need be increased only a degree above said chamber pressure in order to cause the release insuring valve device to operate so as to effect a release of the brakes.

In release position of the triple valve piston, the release insuring valve device is rendered inoperative to continue the venting of fluid under pressure from the auxiliary reservoir due to the fact that the diaphragm is balanced with auxiliary reservoir pressure on both sides.

In the accompanying drawing, the single figure is a diagrammatic view of a fluid pressure brake equipment embodying our invention.

As shown in the drawing, the fluid pressure brake equipment comprises a triple valve device, or other brake controlling valve device 1, an auxiliary reservoir 2 and a brake cylinder 3.

The triple valve device 1 comprises a casing containing a piston 4 having at one side a chamber 5 connected to the usual brake pipe 6 and having at the other side a valve chamber 7 connected to the auxiliary reservoir 2 and containing a main slide valve 8 and an auxiliary slide valve 9 adapted to be operated by said piston. The piston 4 is provided with the usual piston ring 51. The usual retarded release mechanism may be provided in the outer end of valve chamber 7 and comprises a movable abutment 10 and a spring 11 acting on said abutment.

A gasket 12 clamped between the triple valve casing and the cap 13 is provided with a circular thickened portion 14, which extends into the piston chamber 5 and closely engages the casing within the chamber. The thickened portion 14 provides a yielding stop for the triple valve piston and the face 15 of this portion defines the application position of said piston. The inner edge 16 of the gasket is beveled for a portion of its thickness for the purpose of exposing as much of the face of the piston as possible to brake pipe pressure when the piston is in sealing engagement with the gasket.

The release insuring valve device comprises two flexible diaphragms 16 and 17 which are spaced apart and are connected to move in unison by a stem 18 and which are of different areas, diaphragm 16 having a greater area than diaphragm 17. The diaphragm 16 is preferably mounted between the casing and a filling piece 19, while the diaphragm 17 is preferably mounted between the filling piece 19 and a cover plate 20. The diaphragm 16 has at one side a chamber 21 adapted to communicate, in the release position of the triple valve piston 4, with the slide valve chamber 7 through the passages 22 and 23 and a port 24 in the main slide valve 8. Chamber 21 is also adapted to be connected, in said position of the triple valve piston, to the chamber 25 intermediate the diaphragms 16 and 17 through passage 22, cavity 26 in the slide valve 8 and passage 27. The chamber 28 at the outer face of diaphragm 17 is connected through a passage 29 to the slide valve chamber 7.

Carried by and below the diaphragm 17 is a valve 30 adapted to engage a seat rib 45 provided on a nut 31 which has screw-threaded engagement with the cover plate 20. Within the confines of the seat rib 45 is a chamber 46, which has opening into it from the lower face of the nut a passage 32, leading to the atmosphere. Said valve controls the venting of fluid under pressure from the valve chamber 7 to the atmosphere by way of passage 29, chambers 28 and 46 and passage 32.

Mounted in the casing is a check valve 33 which has at one side a chamber 34 connected through a passage 35 to chamber 21 and at the other side a chamber 36 connected through a passage 37 to passage 29, the check valve being mounted in such a manner as to prevent back flow of fluid under pressure from passage 29 to chamber 21. Said valve is normally held seated by the light pressure of a spring 38.

The brake pipe is connected through a pipe and passage 39 to the triple valve piston chamber 5. A branch passage 40 leads from passage 39 to the seat of the main slide valve 8 and is lapped by said valve in the release position of the triple valve piston.

In operation, to initially charge the brake equipment with fluid under pressure, fluid under pressure is supplied to the brake pipe 6 in the usual manner and from thence flows through pipe and passage 40 to the triple valve piston chamber 5.

Assuming the parts to be in the release position shown in the drawing, fluid under pressure flows from piston chamber 5 through a feed passage or groove 41 to valve chamber 7 and from said valve chamber through a passage 42 in the retarded release abutment 43 and passage and pipe 44 to the auxiliary reservoir 2.

Fluid under pressure in valve chamber 7 flows to diaphragm chamber 21 through port 24 in the main slide valve 8 and passages 23 and 22. Fluid under pressure supplied to passage 22 flows also to diaphragm chamber 25 through cavity 26 in the main slide valve 8 and thence through passage 27. Chamber 28, below diaphragm 17, is charged with fluid under pressure from the valve chamber 7 through passage 29. Since the fluid pressures on the diaphragms 16 and 17 are substantially equalized, the valve 30 will be held seated by the fluid pressure in chamber 21 opposing atmospheric pressure in chamber 46 acting upon the inner seated area of valve 30, plus the weight of the diaphragms and connected parts.

With the main slide valve 8 in the release position shown in the drawing, the brake cylinder 3 is open to the atmosphere through pipe and passage 47, cavity 48 in said slide valve and an atmospheric passage 49.

If it is desired to effect an application of the brakes, a gradual reduction in brake pipe pressure is effected in the usual manner, and a corresponding reduction occurs in piston chamber 5. When the pressure in chamber 5 is thus reduced a predetermined degree below the auxiliary reservoir pressure in valve chamber 7, the piston 4 is operated to move the slide valves 8 and 9 to application position in which said piston engages a gasket 14.

In application position of the slide valves 8 and 9, a port 50 in the main slide valve 8 is uncovered by the auxiliary slide valve 9 and registers with the brake cylinder passage 47, so that fluid under pressure is permitted to flow from valve chamber 7 and the connected auxiliary reservoir to the brake cylinder 3 for applying the brakes.

The flow of fluid under pressure from valve chamber 7 to the brake cylinder reduces the pressure in said chamber, and when reduced to slightly below the reduced brake pipe pressure acting in piston chamber 5, the piston 4 and auxiliary slide valve 9 are moved toward the left hand to lap position, in which the port 50 is lapped so as to prevent further flow of fluid under pressure to the brake cylinder.

As the piston 4 moves from release position, shown in the drawing, to application position, passage 23 is disconnected from valve chamber 7 and passage 22 is disconnected from passage 27. However, as the pressure of the fluid in the valve chamber 7, and consequently in chamber 36 above valve 33, is reduced due to the flow of fluid under pressure from the auxiliary reservoir to the brake cylinder, as above described, the greater pressure in diaphragm chamber 21, and consequently in chamber 34 below valve 30, will act to unseat said valve against the pressure of the spring 38, thereby permitting fluid under pressure to flow from chamber 21 to and substantially equalize with the reduced auxiliary reservoir pressure in valve chamber 7 through passage 35, chamber 34, past the valve 33, through chamber 36 and passages 37 and 29.

In application position of the main slide valve 8, passage 27 leading to diaphragm chamber 25 is disconnected from passage 22 leading to diaphragm chamber 21 and is connected through cavity 26 in said valve to passage 40 which connects through passage and pipe 39 to the brake pipe 6. Thus, the pressure in chamber 25 is permitted to reduce with and to brake pipe pressure.

The fluid pressure in chamber 28 will equalize through passage 29 with the pressure of the fluid in valve chamber 7.

Inasmuch as the chambers 21 and 28 are subject, in the manner above described, to reduced auxiliary reservoir pressure and as chamber 25 is subject to reduced brake pipe pressure, which is substantially the same as reduced auxiliary reservoir pressure, the diaphragms will remain in the position shown in the drawing, in which position the valve 30 is held seated.

To effect a release of the brakes after an application, fluid under pressure is supplied to the brake pipe 6 and from thence flows through pipe and passage 39 to the triple valve piston chamber 5. Fluid under pressure supplied to passage 39 also flows to the diaphragm chamber 25 through passage 40, cavity 26 in the main slide valve 8 and passage 27.

The increase in brake pipe pressure in piston chamber 5 above auxiliary reservoir pressure in valve chamber 7 is adapted to move the piston 4 and slide valves 8 and 9 to the release position shown in the drawing. In the release position, the feed passage 41 is opened to the piston chamber 5, so that fluid under pressure is permitted to flow from said piston chamber and the connected brake pipe 6 to valve chamber 7 and from thence to the auxiliary reservoir 2 for charging said reservoir. In release position of the main slide valve 8, fluid under pressure is vented from the brake cylinder 3 through pipe and passage 47, cavity 48 in said slide valve and atmospheric passage 49 to effect a release of the brakes.

If the triple valve device operates as just described to effect a release of the brakes, the movement of the main slide valve 8 to release position disconnects passage 40 from passage 27 and connects passage 27 to passage 22. This movement also causes port 24 in said valve to register with passage 23 and thus fluid under pressure is permitted to flow from the valve chamber 7 to diaphragm chambers 21 and 25 in the manner hereinbefore described. As the diaphragm chamber 28 is continuously connected to said valve chamber, the fluid pressures in chambers 21, 25 and 28 are equalized and the valve 30 remains seated.

If, however, the brake pipe pressure in piston chamber 5 does not increase sufficiently above the auxiliary reservoir pressure in valve chamber 7 to promptly move the triple valve piston 4 and slide valves 8 and 9 to release position, then the increase in brake pipe pressure in diaphragm chamber 25 over auxiliary reservoir pressure in diaphragm chamber 21 creates a pressure differential on the diaphragm 16 which causes the diaphragms 16 and 17 to move upward, so that the valve 30 is moved away from the seat rib 45, permitting the venting of fluid under pressure from the valve chamber 7 to the atmosphere through passage 29, chambers 28 and 46 and through atmospheric passage 32.

The venting of fluid under pressure from valve chamber 7, as just described, continues until a sufficient difference in pressures is obtained in piston chamber 5 and valve chamber 7 to overcome the resistance to movement of piston 4 and slide valves 8 and 9, at which time said piston moves said slide valves to release position.

As hereinbefore described, the movement of piston 4 to release position connects diaphragm chambers 21 and 25 to valve chamber 7, permitting the pressures in chambers 21 and 25 to equalize. The diaphragms 16 and 17 will, therefore, move downwardly so that the valve 30 engages the seat rib 45 and thus cuts off the further venting of fluid under pressure from the auxiliary reservoir to the atmosphere.

If, when the triple valve piston is in application or lap position and brake pipe pressure is being increased to effect a release of the brakes, leakage of brake pipe fluid should occur from the piston chamber 5 past the piston ring 51 into the valve chamber 7, the check valve 33 will prevent the increased pressure in said valve chamber from equalizing into the diaphragm chamber 21, which at this time is subject substantially to the pressure to which the auxiliary reservoir is reduced during an application of the brakes. Such an equalization of pressures, when the increase of brake pipe pressure is at a relatively slow rate, would permit the fluid pressure in said valve chamber to build up at substantially the same rate and to the same degree as the increase in brake pipe pressure. Since the diaphragm chamber 25 is also subject to brake pipe pressure, as previously mentioned, the pressures in chambers 21 and 25 would, therefore, be equalized and the diaphragms 16 and 17 would remain in their normal or lower positions, as shown in the drawing, with the valve 30 seated. Thus, under the conditions cited, the release insuring valve device would fail to operate to reduce valve chamber pressure and would, therefore, fail to insure a release of the brakes.

Since, when the main slide valve is in application position, the fluid pressure in chamber 21 remains substantially equal to the pressure to which auxiliary reservoir pressure is reduced, a differential is promptly established on the diaphragm 16 when brake pipe pressure is being increased to effect a release of the brakes and this differential will cause a prompt movement of the diaphragms 16 and 17 upwardly, so as to unseat the valve 30 and thereby facilitate the release of the brakes, as hereinbefore described. It will thus be seen that, since the diaphragm chamber 21 is isolated from the influence of an increase of fluid pressure in valve chamber 7 when the main slide valve 8 is in application position, the release insuring valve device will operate to insure movement of the triple valve device to release position regardless of leakage of fluid under pressure past the piston ring.

As the piston 4 moves to release position, the passage 40 is disconnected from passage 27 at substantially the same time or slightly in advance of the opening of the feed groove 41 to piston chamber 5, so as to prevent the possibility of supplying fluid under pressure to valve chamber 7 and the auxiliary reservoir at such a rate as to equal the rate at which fluid is vented from the auxiliary reservoir past the valve 30. Such an undesirable condition would tend to effect a balance of forces on the piston 4 and thus prevent movement of the triple valve device to release position.

From the above description, it will be noted that we have provided an improved triple valve device which will operate upon a predetermined small increase in brake pipe pressure to vent fluid under pressure from the auxiliary reservoir for insuring movement of the triple valve device to release position in case the triple valve device does not promptly operate upon an increase in brake pipe pressure less than required to operate the release insuring valve device. Further, that we have provided an improved triple valve device having a release insuring valve device which will operate to facilitate a prompt movement of the triple valve device to release position regardless of leakage which may occur past the piston ring. The connection from the brake pipe to the release insuring valve device for operating said device is established only when the triple valve device is in brake application position and is controlled by the triple valve main slide valve so that when said valve is moved to release position, said connection is closed and the release insuring valve device is conditioned to prevent further venting of fluid under pressure from the auxiliary reservoir.

It will be understood that the subject matter relating to the feature of venting fluid under pressure from the auxiliary reservoir upon an increase in brake pipe pressure in initiating a release of the brakes to facilitate the movement of the parts of a brake controlling valve mechanism to release position is broadly covered in a copending application of Clyde C. Farmer, Serial No. 612,465, filed May 20, 1932, and that the claims in the present application which relate to this feature are intended to cover specific features not included in this Farmer application.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake, the combination with a brake pipe, an auxiliary reservoir, a brake cylinder, and a brake controlling valve device operated upon a reduction in brake pipe pressure for supplying fluid under pressure from the auxiliary reservoir to the brake cylinder, of means for facilitating the release movement of said valve device comprising valve means subject, in the brake application position of said valve device, to the opposing pressures of the brake pipe and a chamber normally charged with fluid under pressure supplied from the auxiliary reservoir and having a communication through which the pressure in said chamber is reduced as the auxiliary reservoir pressure reduces, and means for preventing back flow from the auxiliary reservoir through said communication to said chamber, said valve means being operated upon an increase in brake pipe pressure for venting fluid from the auxiliary reservoir.

2. In a fluid pressure brake, the combination with a brake pipe, an auxiliary reservoir, a brake cylinder, and a brake controlling valve device operated upon a reduction in brake pipe pressure for supplying fluid under pressure from the auxiliary reservoir to the brake cylinder, of means for facilitating the release movement of said valve device comprising valve means subject, in the brake application position of said valve device, to the opposing pressures of the brake pipe and a chamber normally charged with fluid under pressure supplied from the auxiliary reservoir and having a communication through which the pressure in said chamber is reduced as the auxiliary reservoir pressure reduces, and a check valve for preventing back flow from the auxiliary reservoir through said communication to said chamber, said valve means being operated upon an increase in brake pipe pressure for venting fluid from the auxiliary reservoir.

3. In a fluid pressure brake, the combination with a brake pipe, an auxiliary reservoir, a brake cylinder, and a brake controlling valve device operated upon a reduction in brake pipe pressure for supplying fluid under pressure from the auxiliary reservoir to the brake cylinder, of valve means for facilitating the release movement of said valve device comprising a chamber normally charged with fluid under pressure supplied from the auxiliary reservoir and having a connection through which the pressure in said chamber is reduced as the auxiliary reservoir reduces, means for preventing back flow from the auxiliary reservoir through said communication to said chamber, a second chamber subject to brake pipe pressure in the brake application position of said valve device, and a movable abutment subject to the opposing pressures of said chambers and operative upon an increase in brake pipe pressure in said second mentioned chamber to vent fluid under pressure from the auxiliary reservoir.

4. In a fluid pressure brake, the combination with a brake pipe, an auxiliary reservoir, a brake cylinder, and a brake controlling valve device operated upon a reduction in brake pipe pressure for supplying fluid under pressure from the auxiliary reservoir to the brake cylinder, of valve means for facilitating the release movement of said valve device comprising a chamber normally charged with fluid under pressure supplied from the auxiliary reservoir and having a connection through which the pressure in said chamber is reduced as the auxiliary reservoir reduces, means for preventing back flow from the auxiliary reservoir through said communication to said chamber, a second chamber subject to brake pipe pressure in the brake application position of said valve device, a movable abutment subject to the opposing pressures of said chambers, and another abutment movable by the first mentioned abutment upon an increase in brake pipe pressure in said second mentioned chamber for venting fluid under pressure from the auxiliary reservoir.

5. In a fluid pressure brake, the combination with a brake pipe, an auxiliary reservoir, a brake cylinder, and a brake controlling valve device operated upon a reduction in brake pipe pressure for supplying fluid under pressure from the auxiliary reservoir to the brake cylinder, of valve means for facilitating the release movement of said valve device comprising a chamber normally charged with fluid under pressure supplied from the auxiliary reservoir and having a connection through which the pressure in said chamber is reduced as the auxiliary reservoir reduces, means for preventing back flow from the auxiliary reservoir through said communication to said chamber, a second chamber subject to brake pipe pressure in the brake application position of said valve device, a third chamber subject to auxiliary reservoir pressure, a movable abutment subject to the opposing pressures of said first and second mentioned chambers, and another abutment subject to the opposing pressures of said second and third mentioned chambers and movable by said first mentioned abutment upon an increase in brake pipe pressure in the second mentioned chamber for venting fluid under pressure from the auxiliary reservoir.

6. In a fluid pressure brake, the combination with a brake pipe, an auxiliary reservoir, a brake cylinder, and a brake controlling valve device operated upon a reduction in brake pipe pressure for supplying fluid under pressure from the auxiliary reservoir to the brake cylinder, of valve means for facilitating the release movement of said valve device comprising a chamber normally charged with fluid under pressure supplied from the auxiliary reservoir and having a connection through which the pressure in said chamber is reduced as the auxiliary reservoir reduces, means for preventing back flow from the auxiliary reservoir through said communication to said chamber, a second chamber subject to brake pipe pressure in the brake application position of said valve device, a movable abutment subject to the opposing pressures of said chambers, and another abutment of smaller area than and movable by said first mentioned abutment upon an increase in brake pipe pressure in the second mentioned chamber for venting fluid under pressure from the auxiliary reservoir.

7. In a fluid pressure brake, the combination with a brake pipe, an auxiliary reservoir, a brake cylinder, and a brake controlling valve device operated upon a reduction in brake pipe pressure for supplying fluid under pressure from the auxiliary reservoir to the brake cylinder, a valve means for facilitating the release movement of said valve device comprising a chamber normally charged with fluid under pressure supplied from the auxiliary reservoir and having a connection through which the pressure in said chamber is reduced as the auxiliary reservoir reduces, means for preventing back flow from the auxiliary reservoir through said communication to said chamber, a second chamber subject to brake pipe pressure in the brake application position of said valve device, a third chamber subject to auxiliary reservoir pressure, a movable abutment subject to the opposing pressures of said first and second mentioned chambers, and another abutment of smaller area than said first mentioned abutment and subject to the opposing pressures of said second and third mentioned chambers, said last mentioned abutment being movable by said first mentioned abutment upon an increase in brake pipe pressure in said second mentioned chamber for venting fluid under pressure from the auxiliary reservoir.

8. In a fluid pressure brake, the combination with a brake pipe, an auxiliary reservoir, a brake cylinder, and a brake controlling valve device comprising a piston subject to the opposing pressures of the brake pipe and the auxiliary reservoir and valve means movable by said piston to an application position for effecting an application of the brakes and to a release position for effecting a release of the brakes, of a chamber, a passage controlled by said valve means for connecting said chamber to the auxiliary reservoir when said piston is in the release position, said passage being closed in the application position, a second passage through which the pressure in said chamber is reduced as the auxiliary reservoir pressure reduces, means for preventing back flow through said second mentioned passage from the auxiliary reservoir to said chamber, and valve means for facilitating the release movement of said piston comprising a movable abutment subject in the application position of said piston to the opposing pressures of the brake pipe and said chamber and operated upon an increase in brake pipe pressure for venting fluid from the auxiliary reservoir.

9. In a fluid pressure brake, the combination with a brake pipe, an auxiliary reservoir, and a brake cylinder, of a brake controlling valve device having a feed passage for supplying fluid under pressure from the brake pipe to the auxiliary reservoir and comprising a piston subject to the opposing pressures of the brake pipe and auxiliary reservoir and movable to a release position for opening communication through said feed passage, said piston being movable to an application position upon a reduction in brake pipe pressure to close said communication and to effect an application of the brakes, valve means for facilitating the release movement of said piston and comprising a movable abutment subject at one side to substantially the pressure to which the auxiliary reservoir reduces in effecting an application of the brakes and at the other side to the pressure of fluid supplied from the brake pipe, and valve means movable by said piston for cutting off the last mentioned fluid supply in advance of the opening of said feed passage.

10. In a fluid pressure brake, the combination with a brake pipe, an auxiliary reservoir, a brake cylinder, and a brake controlling valve device comprising a casing containing a piston having a valve chamber at one side open to the brake pipe and valve means movable by said piston to an application position for effecting an application of the brakes and to a release position for effecting a release of the brakes, of a valve device operative upon an increase in brake pipe pressure to vent fluid under pressure from the auxiliary reservoir for facilitating the release movement of said piston, said valve device comprising a pair of flexible diaphragms having differential areas and spaced apart and connected to move in unison, a casing mounted on the brake controlling valve casing and containing an openended bore, a cover plate member mounted on said casing, the larger of said diaphragms being clamped between said casings and the smaller of said diaphragms being clamped between said second mentioned casing and said cover plate, a chamber at one side of the large diaphragm normally charged with fluid under pressure supplied from the auxiliary reservoir and subject in the brake application position of said valve device to substantially the pressure to which the auxiliary reservoir is reduced, a chamber intermediate said diaphragms and defined by said diaphragms and said bore in said first mentioned casing, said chamber being subject to auxiliary reservoir pressure when said valve means is in the release position and to brake pipe pressure when said valve means is in the brake application position, a chamber at the other side of said small diaphragm in constant communication with the auxiliary reservoir, a passage connecting said chamber to the atmosphere, and a vent valve operated by said diaphragms to open communication from said last mentioned chamber to said passage when said diaphragms are deflected by an increase in brake pipe pressure in said second mentioned chamber over the pressure in said first mentioned chamber.

11. In a fluid pressure brake, the combination with a brake pipe, an auxiliary reservoir and a brake cylinder, of an equalizing valve device subject to the opposing pressures of the brake pipe and auxiliary reservoir and operated upon a reduction in brake pipe pressure for supplying fluid under pressure from the auxiliary reservoir to the brake cylinder and operated when brake pipe pressure is in excess of auxiliary reservoir pressure for releasing fluid under pressure from the brake cylinder, a control chamber charged with fluid at a pressure corresponding substantially to the reduced pressure of the auxiliary reservoir, means for preventing an increase in the pressure of fluid in said chamber during the release movement of the equalizing valve device, another chamber charged with fluid under pressure in the application position of the equalizing valve device and means subject to the opposing pressures of said chambers and operated upon an increase in the pressure of fluid in the last mentioned chamber, upon an increase in brake pipe pressure in initiating the release of the brakes, for venting fluid under pressure from the auxiliary reservoir.

12. In a fluid pressure brake, in combination, a brake pipe, a reservoir charged with fluid under pressure, an equalizing valve mechanism subject to the opposing pressures of the brake pipe and reservoir and operative upon a reduction in brake pipe pressure for supplying fluid under pressure from the reservoir to effect an application of the brakes, the flow of fluid to effect an application of the brakes effecting a reduction in the pressure of fluid in the reservoir, and operable upon an increase in brake pipe pressure to effect a release of the brakes, means subject to a pressure substantially commensurate with the reduced reservoir pressure and to the opposing pressure of the brake pipe operative upon an increase in brake pipe pressure for venting fluid under pressure from the reservoir, and means for preventing an increase in the pressure of fluid in the reservoir from increasing the pressure acting on the first mentioned means in opposition to brake pipe pressure while the brakes are applied.

13. In a fluid pressure brake, in combination, a brake pipe, a reservoir charged with fluid under pressure, an equalizing valve mechanism subject to the opposing pressures of the brake pipe and reservoir and operative upon a reduction in brake pipe pressure for supplying fluid under pressure from the reservoir to effect an application of the brakes, the flow of fluid to effect an application of the brakes effecting a reduction in the pressure of fluid in the reservoir, and operable upon an increase in brake pipe pressure to effect a release of the brakes, means subject to a control pressure acting in opposition to brake pipe pressure and operative upon an increase in brake pipe pressure to vent fluid under pressure from the reservoir, means for regulating the control pressure according to the reduced reservoir pressure when the equalizing valve device is in position to supply fluid from the reservoir to effect an application of the brakes, and for maintaining said control pressure constant until said equalizing valve device has been moved to brake releasing position.

14. In a fluid pressure brake, in combination, a brake pipe, a reservoir charged with fluid under pressure, an equalizing valve mechanism subject to the opposing pressures of the brake pipe and reservoir and operative upon a reduction in brake pipe pressure for supplying fluid under pressure from the reservoir to effect an application of the brakes, the flow of fluid to effect an application of the brakes effecting a reduction in the pressure of fluid in the reservoir, and operable upon an increase in brake pipe pressure to effect a release of the brakes, means subject to a control pressure acting in opposition to brake pipe pressure and operative upon an increase in brake pipe pressure to vent fluid under pressure from the reservoir, means for regulating the control pressure according to the reduced reservoir pressure when the equalizing valve device is in position to supply fluid from the reservoir to effect an application of the brakes, and for preventing an increase in said control pressure while the brakes are applied.

15. In a fluid pressure brake, in combination, a brake pipe, a reservoir charged with fluid under pressure, an equalizing valve mechanism subject to the opposing pressures of the brake pipe and reservoir and operative upon a reduction in brake pipe pressure for supplying fluid under pressure from the reservoir to effect an application of the brakes, the flow of fluid to effect an application of the brakes effecting a reduction in the pressure of fluid in the reservoir, and operable upon an increase in brake pipe pressure to effect a release of the brakes, means subject to a control pressure acting in opposition to brake pipe pressure and operative upon an increase in brake pipe pressure to vent fluid under pressure from the reservoir, means for regulating the control pressure according to the reduced reservoir pressure when equalizing valve device is in position to supply fluid from the reservoir to effect an application of the brakes, and for preventing an increase in the pressure of fluid in the reservoir while the equalizing valve device is in a braking position from increasing the control pressure.

16. In a fluid pressure brake, in combination, a brake pipe, a reservoir charged with fluid under pressure, an equalizing valve mechanism subject to the opposing pressures of the brake pipe and reservoir and operative upon a reduction in brake pipe pressure for supplying fluid under pressure from the reservoir to effect an application of the brakes, the flow of fluid to effect an application of the brakes effecting a reduction in the pressure of fluid in the reservoir, and operable upon an increase in brake pipe pressure to effect a release of the brakes, means subject to a control chamber which, in effecting an application of the brakes is charged with fluid at a pressure corresponding substantially to the reduced reservoir pressure, means for preventing an increase in the pressure of fluid in the reservoir before the equalizing valve device is moved to a brake releasing position from increasing the pressure of fluid in the control chamber, a valve operative to vent fluid under pressure from said reservoir to facilitate the movement of the equalizing valve device to brake releasing position, and means subject to the pressure of the control chamber and operative upon an increase in brake pipe pressure for actuating said valve to its venting position.

17. In a fluid pressure brake, in combination, a brake pipe, a brake cylinder, an auxiliary reservoir charged with fluid under pressure, an equalizing valve device subject to the opposing pressures of the brake pipe and auxiliary reservoir and operative upon a reduction in brake pipe pressure for supplying fluid under pressure from the auxiliary reservoir to the brake cylinder to effect an application of the brakes, the flow of fluid to the brake cylinder effecting a reduction in auxiliary reservoir pressure, and operative upon an increase in brake pipe pressure to effect a release of the brakes, a control chamber which with the equalizing valve device in brake applying position is charged with fluid at a pressure corresponding substantially to the reduced auxiliary reservoir pressure, a valve operative to vent fluid under pressure from the auxiliary reservoir, means subject to the opposing pressures of the control chamber and brake pipe and operative upon an increase in brake pipe pressure for actuating said valve to vent fluid under pressure from the auxiliary reservoir and means preventing back-flow of fluid under pressure from the auxiliary reservoir to the control chamber when the brake pipe pressure is increased to effect the release of the brakes.

18. In a fluid pressure brake, the combination with a brake pipe, an auxiliary reservoir and a brake cylinder, of an equalizing valve device subject to the opposing pressures of the brake pipe and auxiliary reservoir and operated upon a reduction in brake pipe pressure for supplying fluid under pressure from the auxiliary reservoir to the brake cylinder and operated when brake pipe pressure is in excess of auxiliary reservoir pressure for releasing fluid under pressure from the brake cylinder, a control chamber which when the equalizing valve device is moved to brake applying position is charged with fluid at a pressure corresponding substantially to the reduced auxiliary reservoir pressure, means subject to the opposing pressures of the control chamber and brake pipe and operative upon an increase in brake pipe pressure in initiating the release of the brakes for venting fluid under pressure from the auxiliary reservoir, and means for preventing an increase in the pressure of fluid in the control chamber during the release movement of the equalizing valve device.

EARLE S. COOK.
ELLERY R. FITCH.